United States Patent [19]

Thomas

[11] Patent Number: 5,112,538
[45] Date of Patent: May 12, 1992

[54] APPARATUS FOR CONCENTRATING BLEED-OFF WATER FOR EVAPORATING COOLERS

[75] Inventor: Patricia T. Thomas, North Fort Myers, Fla.

[73] Assignee: Munters Corporation, Fort Myers, Fla.

[21] Appl. No.: 769,798

[22] Filed: Oct. 2, 1991

Related U.S. Application Data

[63] Continuation-in-part of Ser. No. 614,277, Nov. 15, 1990, Pat. No. 5,055,239.

[51] Int. Cl.⁵ .............................................. B01F 3/04
[52] U.S. Cl. .................................................. 261/112.2
[58] Field of Search ..................................... 261/112.2

[56] References Cited

U.S. PATENT DOCUMENTS

| | | | |
|---|---|---|---|
| 3,265,550 | 8/1966 | Lindquist | 261/112.2 |
| 3,395,903 | 8/1968 | Norback et al. | 261/112.2 |
| 3,500,615 | 3/1970 | Meek | 261/112.2 |
| 3,792,841 | 2/1974 | Nakako et al. | 261/112.2 |
| 4,361,522 | 11/1982 | Goettl | 261/66 |
| 4,670,196 | 6/1987 | Hsia | 261/112.2 |
| 4,710,326 | 12/1987 | Seah | 261/112.2 |
| 4,994,211 | 2/1991 | Fuller | 261/97 |

Primary Examiner—Tim Miles
Attorney, Agent, or Firm—Fitzpatrick, Cella, Harper & Scinto

[57] ABSTRACT

A gas and liquid contact apparatus in which gas and liquid flow in cross-flow relationship to one another is disclosed. The apparatus includes a contact body formed of a plurality of sheets of corrugated material having first and second opposed edges with corrugations formed in the sheets extending at an angle to the edges and abutting each other at points in adjacent sheets to form through-passing channels for gas and liquid. The first and second edges of the sheets define gas inlet and outlet edges in the contact body. The gas inlet edge has a plurality of rows of generally channel-shaped notches formed therein so that liquid flowing through the contact body will agglomerate at the notches. The agglomerated liquid will flow downwardly along the gas inlet edge of the contact body to clean the sheet at that gas inlet edge. A collection trough is located along one of the rows and includes a flange extending into one row of notches to intercept contaminated water along the inlet edge and remove it from the system.

11 Claims, 1 Drawing Sheet

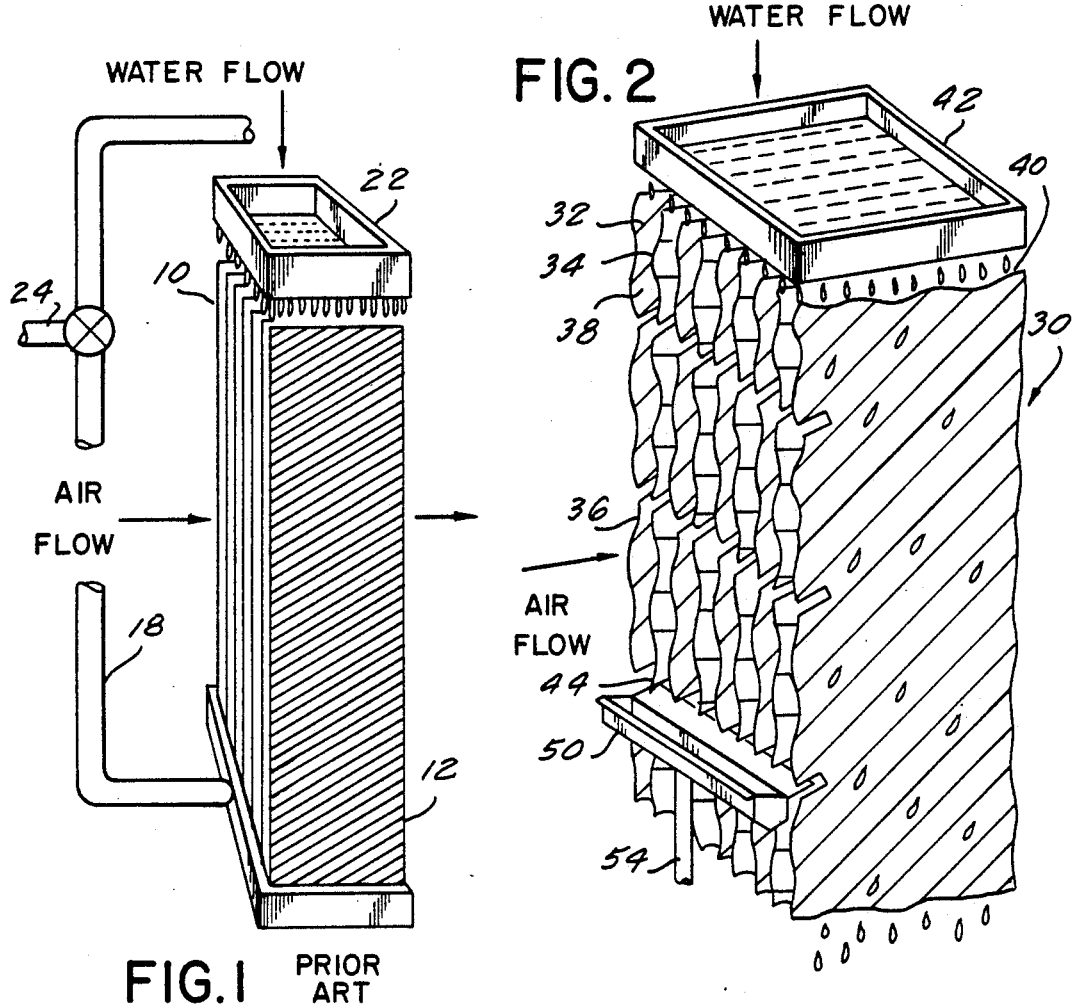
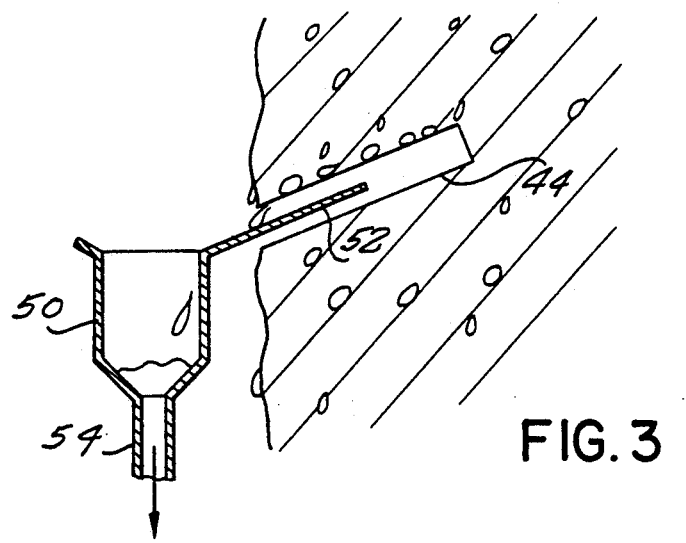

APPARATUS FOR CONCENTRATING BLEED-OFF WATER FOR EVAPORATING COOLERS

CROSS REFERENCE TO RELATED APPLICATIONS

This application is a continuation-in-part of U.S. patent application Ser. No. 07/614,277 filed Nov. 15, 1990, now U.S. Pat. No. 5,055,239.

The present invention relates to gas and liquid contact apparatus and more particularly to a self-cleaning gas and liquid contact body including apparatus for concentrating bleed off water.

Air and liquid contact bodies for use in evaporative coolers, humidifiers, heat exchangers and air filters have been proposed in the past which permit cross-flow of air and liquid in the body. These contact bodies have previously been constructed of cross corrugated sheets of material such as plastic, cellulose, paper and other kinds of materials, as are well known in the art. Such contact bodies are disclosed for example in U.S. Pat. Nos. 3,792,841; 3,395,903; and 3,500,615. These contact bodies, such as disclosed in U.S. Pat. No. 3,792,841 have been generally satisfactory in use and commercially successful. However, it has been found that where the gas being treated has suspended particles such as airborne dust or debris, and/or the liquid contains suspended solids, dissolved solids or minerals, the passages formed in the contact body by the corrugated sheets become clogged with deposited material. It has more particularly been found that deposition of suspended materials and clogging are most severe at the gas inlet side or edge of the contact body particularly along the first one-half to two inches of the body in the direction of gas flow. Often the remainder of the contact body (which may be up to 24 inches or more in depth) is relatively clean. The invention described in my prior patent application Ser. No. 07/614,277 overcomes these problems.

Contact bodies of the type described in that application are typically used in evaporative coolers. Such coolers are used effectively in place of vapor compression type air conditioners, particularly in arid climates. Such coolers have the distinct advantage of using considerably less energy than vapor compression air conditioners. They have the additional advantage of not requiring the use of chlorfluorocarbons (CFC's) to achieve a significant amount of cooling. Unfortunately, water is usually in short supply and of very poor quality in these climates.

Evaporative coolers achieve cooling by evaporating water in the air stream. The drier the air is, the more intense the evaporation will be, with the effect that greater cooling is achieved.

In operation, cooling water is recirculated over the surface of the evaporative media in the cooler and a portion of the pure water is evaporated with each pass. As a result fresh water is constantly introduced to the system to make up for the evaporation. However, as the water evaporates, it leaves behind, in the recirculating water, the minerals which it contained. In order to avoid concentrating the minerals to a degree where they begin to plate or coat the cooling media, a "bleed-off" system is often provided. This water bleed-off from the system contains a higher concentration of mineral contaminants than the fresh water added to the system and is discarded.

Previously proposed bleed-off systems use one of several methods of keeping the contaminant level in the cooling water below undesirable levels. One such method, as described in U.S. Pat No. 4,994,211, simply discards water after it has passed through the media one time. Another system uses a sump tank with an overflow outlet which constantly bleeds off a portion of the water during operation of the cooler, while a third system produces a sidestream from the recirculating pump which diverts water from the pump. This diversion can be controlled by a timer, a solenoid controlled by the conductivity of the water or by line pressure from the pump. The latter two systems discard water which is a mixture of fresh water and concentrated recirculated water. A fourth system is disclosed in U.S. Pat. No. 4,361,522 which discards all of the system water according to a timer or thermostat.

As will be apparent, each of the previously proposed bleed-off systems suffers from the same disadvantage and inefficiency. They discard some or all of the fresh water and not only the most concentrated water in the system.

It is an object of the present invention to provide an improved gas liquid contact body which has a self-cleansing action and a bleed-off system which removes concentrated contaminated water.

Another object of the present invention is to provide an improved gas liquid contact apparatus of the type described.

A still further object of the present invention is to provide a self-cleansing gas liquid contact body and bleed-off system which is relatively simple to manufacture.

In accordance with an aspect of the present invention a gas and liquid contact body for use in a gas and liquid contact apparatus wherein gas and liquid flow in cross-flow relationship to one another is provided in which the contact body is formed of first and second sets of corrugated sheets having corrugations formed therein that are disposed in a direction transversely of the horizontal plane of the contact body. The sheets of the first set are disposed alternately with the sheets of the second set, with the corrugations of the first set crossing the corrugations of the second set. The contact body has a gas inlet edge and a gas outlet edge defined by the opposite edges of the sheets in the two sets. The crossed corrugations of the sheets define passageways penetrating from the gas inlet edge to the gas outlet edge of the body. At least one of the gas inlet edges and/or the gas outlet edge is provided with a plurality of generally channel-shaped notches formed therein so that liquid flowing through the contact body along the corrugations toward the edge of the contact body having the notches formed therein will agglomerate at the notches. Where the notches are formed in the gas inlet side of the contact body the agglomerated liquid will flow down along the gas inlet edge and cleanse the surfaces of the corrugated sheets. Where the notches are formed in the gas outlet edge of the contact body the liquid will agglomerate along the notches and flow away from the gas outlet edge toward the gas inlet edge and again cleanse the gas inlet edge of the contact body. One or more of these aligned notches on the contact body have a collection device or gutter mounted adjacent to it, including a catch lip in the notch to remove the concentrated contaminated water at the notch from the system.

The above, and other objects, features and advantages of the present invention will be apparent from the following detailed description of illustrative embodiments thereof when considered in connection with the accompanying drawings wherein:

BRIEF DESCRIPTION OF THE DRAWINGS

FIG. 1 is a perspective view of a conventional prior art gas liquid contact body formed of cross-corrugated sheets of material;

FIG. 2 is a perspective view of a gas liquid contact body including a bleed-off system in accordance with the present invention; and FIG. 3 is an enlarged partial side view of a notched portion of the gas inlet side of the gas liquid contact body of FIG. 2 with the bleed system in place.

Referring now to the drawing in detail, and initially to FIG. 1 thereof, a conventional gas liquid contact body 10 is illustrated which is formed of a plurality of sheets of corrugated material 12. The sheets 12 are corrugated in a conventional manner and formed of any known material suitable in the art for use in such apparatus. Alternate corrugated sheets are arranged in abutting relation to each other so that point contact is made between the corrugations on adjacent sheets in order to form air and liquid passages from one edge of the contact body to the other. The corrugations can be positioned at equal angles, for example as shown and disclosed in U.S. Pat. No. 3,395,903, or they can be arranged at unequal angles, as disclosed for example in U.S. Pat. No. 3,792,841.

The apparatus of FIG. 1 includes a conventional contaminated water bleed-off system 14 in which water discharged from the bottom of the contact body 10 is captured in a sump 16 and pumped through line 18 by pump 20 for redistribution in the water distribution system 22. The pump includes an auxiliary or sidestream outlet through which recirculated contaminated water is periodically discharged under the control of a timer or solenoid, as described above. Make-up fresh water is added to the distribution system 22 in any convenient or known manner.

FIG. 2 illustrates a gas liquid contact body 30 constructed in accordance with the present invention. Contact body 30 is formed of a plurality of sheets of corrugated fill material. A first set of sheets 32 is alternated with a second set of sheets 34 in the conventional way. The corrugations in the sheets can be positioned at equal angles, or at unequal angles, as disclosed in U.S. Pat. No. 3,792,841. Gas is supplied to the gas inlet edge or face 36 of the contact body in a conventional manner to flow through the channels 38 formed in the contact body by the cross-corrugations. Liquid is supplied to the top 40 of the contact body in any convenient way. In the illustrative embodiment a perforated pan 42 is positioned above the top edge 40 of the contact body and liquid, e.g. water, is supplied to the pan and distributed along the top edge of the contact body. The liquid flows downwardly in the contact body under the influence of gravity where it is met by the cross-flowing gas or air for gas cleaning, cooling, heating or humidification purposes.

In accordance with an aspect of the present invention a plurality of notches 44 are formed in the gas inlet face or edge of the contact body at vertically spaced locations along the edge. As described in my prior copending application, the notches 44 are formed in the inlet edge of the contact body. As a result, liquid flowing through the contact body, will cling to the edges of the notches due to surface tension. The liquid will agglomerate at these edges and follow the opening of the notch to the lowest point where it will drip off on to the lower surface of the notch and travel along the gas inlet edges of the contact body. By thus forcing additional liquid to flow along the gas inlet edges of a contact body these edges, which can become dirty and clogged, are cleansed. The exact point where the liquid drops off of the notch can be controlled by varying the shape and size of the notch.

With this arrangement, when the liquid and gas flow are stopped, any liquid remaining in the contact body will also continue to run down the edge of the notch and continue to clean the entering face of the media. This provides an additional post operation cleaning for the contact body.

As will be appreciated, the inlet face of the contact body comes into contact with the hottest, driest air. Evaporation, therefore, is the most intensive in the air entering face of the media and it decreases considerably toward the air leaving face. It is the air entering face which collects dust, dirt and other contaminants. Thus, it is the water along the inlet edges concentrated by the notches 44 which is the dirtiest water in the system.

In accordance with the present invention this dirty water is bled off from the system independently of the cleaner water flowing inwardly of the face of the contact body. This is accomplished by the provision of a collection trough or gutter 50 along one of the notches. This trough has an integral flange 52 extending therefrom into its adjacent associated row of notches 44. As seen in FIG. 3, water dripping off the upper edges of the notches will be intercepted by flange 52 and flow into the trough 50. The collected water is then discarded, through the outlet pipe 54 to a drain (not shown). The flange is shown closely spaced to the top edge of notches 44. This will help in allowing surface tension to draw water from the face of the media into the flange.

The trough 50 is shown positioned adjacent the lowermost row of notches 44, but it is to be understood that it could be positioned adjacent notches higher up in the pack, depending upon the concentration of contaminants. Additionally, the trough may be provided in varying dimensions proportionate to the amount of water to be removed from the system. Thus, while FIG. 2 illustrates the trough extending across the entire face of body 10, it could be shorter. And, if necessary the amount of water directed to the drain may be controlled further by providing restrictions or bypasses on the gutter or on pipe 54.

The trough 50, which may be formed or metal or plastic, is held in position in any convenient manner. For example, it could be supported directly on pipe 54 as shown, or suspended from the water supply system 42.

Since in arid climates the water on the face of the media may contain 20% more contaminants than the make-up water, a bleed system as described above will remove a greater quantity of contaminants by removing only the dirtiest water, thereby substantially reducing the possibility of scale build up on the media. Conversely, the quantity of water can be reduced and still maintain the mineral content of a standard side stream bleed-off system.

Although an illustrative embodiment of the present invention has been described herein in detail, it is to be understood that the invention is not limited to the foregoing and that various changes and modifications may be effected therein by one skilled in the art without departing from the scope or spirit of this invention.

What is claimed is:

1. A gas and liquid contact apparatus in which gas and liquid flow in cross-flow relationship to one another comprising, a contact body including first and second sets of corrugated sheets having corrugations formed therein disposed in a direction transversely of the horizontal plane of the contact body, the sheets of the first set being disposed alternatively with the sheets of the second set with the corrugations of the first set crossing the corrugations of the second set, said body having a gas inlet edge and a gas outlet edge defined by the opposite edges of the sheets and said crossed corrugations defining passageways penetrating from said gas inlet edge to said gas outlet edge of said body; said gas inlet edge having a plurality of generally channel-shaped notches formed therein whereby liquid flowing through the contact body will agglomerate at said notches; and means in at least one of said rows for removing liquid in that row of notches from the contact body.

2. A gas and liquid contact apparatus as defined in claim 1 wherein said means includes a flange in said row of notches and an associated trough connected to the flange and located outside of the contact body, whereby the liquid agglomerating at said notches will flow downwardly along said gas inlet edge to clean said sheets at said gas inlet edge, be intercepted by said flange, and directed by the flange to the trough.

3. A gas and liquid contact apparatus as defined in claim 2 wherein said notches are formed at an acute angle to the horizontal in said edge.

4. A gas and liquid contact apparatus as defined in claim 3 wherein said notches are generally rectangular in shape having an open side at said gas inlet edge.

5. A gas and liquid contact apparatus as defined in claim 1 wherein the corrugations of said first set of sheets are inclined upwardly in the direction of gas flow, the corrugations of said second set of sheets are inclined downwardly in the direction of gas flow, and the inclination of said crossed corrugations are non-symmetrical relative to a vertical plane extending perpendicular to the direction of the gas stream as it enters said contact body, with the corrugations of said first set of sheets having a greater inclination to said horizontal plane than the corrugations in said second set of sheets whereby liquid in said contact body tends to flow toward said gas inlet edge.

6. A gas and liquid contact body for use in a gas and liquid contact apparatus in which gas and liquid flow in cross flow relationship to one another comprising a contact body formed of a plurality of corrugated sheets having opposed first and second edges and being disposed in facially opposed and substantially parallel relationship to one another to define a plurality of intersecting and intercommunicating passages allowing the passage of gas and liquid therethrough, said first edges of said sheets defining a gas inlet edge of the contact body and said second edges defining a gas outlet edge, the corrugations in each of said sheets extending at an angle to the main direction of flow of the gas through the contact body from said gas inlet edge to said gas outlet edge with the corrugations in alternate sheets being disposed at an angle to the corrugations in the strips disposed between the alternate strips; said gas inlet edge having a plurality of rows of generally channel-shaped notches formed therein whereby liquid flowing through the contact body will agglomerate at said notches; and means in at least one of said rows of notches for removing liquid in that row from the contact body.

7. A gas and liquid contact apparatus as defined in claim 6 wherein said means includes a flange in said row of notches and an associated trough connected to the flange and located outside of the contact body, whereby the liquid agglomerating at said notches will flow downwardly along said gas inlet edge to clean said sheets at said gas inlet edge, be intercepted by said flange and directed by the flange to the trough.

8. A gas and liquid contact apparatus as defined in claim 6 wherein said notches are formed at an acute angle to the horizontal in said edge.

9. A gas and liquid contact apparatus in which gas and liquid flow in cross-flow relationship to one another comprising a contact body formed of a plurality of sheets of corrugated material having first and second opposed edges with corrugations formed in said sheets extending at an angle to said edges and abutting each other at points in adjacent sheets to form through-passing channels for gas and liquid, said first and second edges defining an inlet and an outlet edge in said body; said gas inlet edge having a plurality of rows of generally channel-shaped notches formed therein whereby liquid flowing through the contact body will agglomerate at said notches; and means in at least one of said rows for removing liquid in that row of notches from the contact body.

10. A gas and liquid contact apparatus as defined in claim 9 wherein said means includes a flange in said row of notches and an associated trough connected to the flange and located outside of the contact body, whereby the liquid agglomerating at said notches will flow downwardly along said gas inlet edge to clean said sheets at said gas inlet edge, be intercepted by said flange and directed by the flange to the trough.

11. A gas and liquid contact apparatus as defined in claim 9 wherein said means includes a flange in said row of notches and an associated trough connected to the flange and located outside of the contact body, whereby the liquid agglomerating at said notches will flow downwardly along said gas inlet edge to clean said sheets at said gas inlet edge, be intercepted by said flange, and directed by the flange to the trough.

* * * * *